A. H. Bixler.
Open Ring.
Nº 77,441. Patented May 5, 1868.
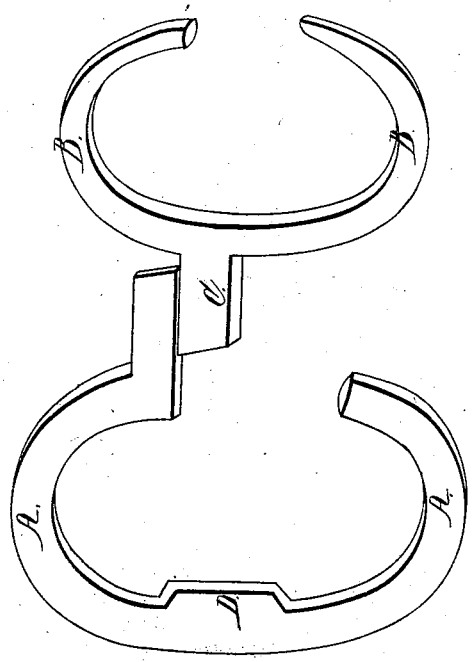
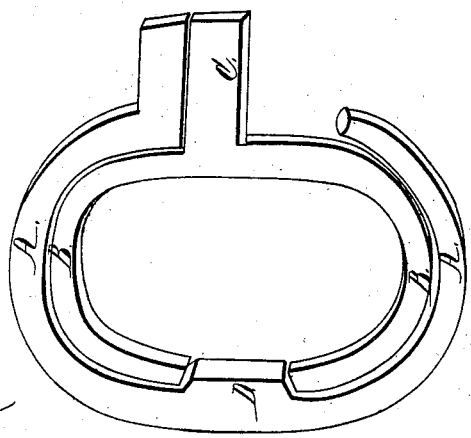
Witnesses:
Jacob Bixler
H. H. Grove
Inventor:
Andrew H. Bixler

UNITED STATES PATENT OFFICE.

ANDREW H. BIXLER, OF CARLISLE, PENNSYLVANIA.

IMPROVEMENT IN OPEN RINGS.

Specification forming part of Letters Patent No. 77,441, dated May 5, 1868.

*To all whom it may concern:*

Be it known that I, ANDREW H. BIXLER, of Carlisle, Cumberland county, Pennsylvania, have invented a new and useful Improved Open Ring; and I do hereby declare that the following is a full, clear, and exact description of the construction and operation of the same, reference being had to the annexed drawings, forming a part of this specification, in which—

Figure 1 is a perspective view of the ring when closed. Fig. 2 is a perspective view of the ring when open.

To enable others skilled in the art to make and use my invention, I will describe its construction and operation.

I compose my ring of two elliptical parts, A A and B B, which I join by a hinge and pin, C. At D, I extend the part A A in width and thickness into a trapezoid, the shorter of the unequal or parallel sides being uppermost. Upon the ends of this trapezoid extension of A A rest the correspondingly-shaped ends of B B when the ring is closed.

In using this ring I open it and insert the part A A in the ring or other attachment of the single-tree, &c., resting said attachment against the extension D. I then insert the part B B in the other or opposite ring or attachment until said ring or attachment is opposite the opening of A A, when I close to the parts A A and B B, the one ring or attachment then sliding over A B at one end of the ring and the other attachment sliding into a similar position at the other end.

I claim and desire to secure by Letters Patent—

The elliptical parts A A and B B, joined by the hinge and pin C, and the trapezoid extension D of the part A A, all constructed and combined in the manner and for the purpose herein set forth.

ANDREW H. BIXLER.

Witnesses:
 JACOB BIXLER,
 H. H. GROVE.